US009854643B2

(12) United States Patent
Husen et al.

(10) Patent No.: US 9,854,643 B2
(45) Date of Patent: Dec. 26, 2017

(54) DEMAND RESPONSIVE LIGHTING CONTROL SYSTEM AND METHOD

(71) Applicant: PHILIPS LIGHTING HOLDING B.V., Eindhoven (NL)

(72) Inventors: Sri Andari Husen, Eindhoven (NL); Yao-Jung Wen, Concord, CA (US); Jules Martinus Adrianus Gerardus De Laat, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/383,783

(22) Filed: Dec. 19, 2016

(65) Prior Publication Data

US 2017/0181247 A1 Jun. 22, 2017

Related U.S. Application Data

(60) Provisional application No. 62/270,914, filed on Dec. 22, 2015.

(30) Foreign Application Priority Data

Apr. 15, 2016 (EP) ..................................... 16165467

(51) Int. Cl.
*H05B 37/02* (2006.01)
*H05B 33/08* (2006.01)

(52) U.S. Cl.
CPC ..... *H05B 37/0218* (2013.01); *H05B 33/0845* (2013.01); *H05B 37/0227* (2013.01); *H05B 37/0245* (2013.01); *H05B 37/0254* (2013.01)

(58) Field of Classification Search
CPC ............ H05B 33/0845; H05B 37/0218; H05B 37/0227; H05B 37/0245; H05B 37/0254
(Continued)

(56) References Cited

U.S. PATENT DOCUMENTS 5,357,170 A * 10/1994 Luchaco ................ H05B 37/02
   315/149
6,225,760 B1 * 5/2001 Moan ...................... H01J 9/445
   315/209 R
(Continued)

FOREIGN PATENT DOCUMENTS

WO    WO2015189118 A1    12/2015

OTHER PUBLICATIONS

N. Motegi, et al., "Introduction to Commercial Building Control Strategies and Techniques for Demand Response", Demand Response Research Center, Ernest Orlando Lawrence Berkeley National Laboratory, Berkeley, CA, 94720, USA, May 22, 2007, pp. 1-76.

*Primary Examiner* — Tung X Le (57) ABSTRACT

The invention relates to a light control system (120;121) for controlling a lighting system (100). The light control system (120;121) is arranged to receive a power reduction parameter (alpha). The light control system comprising a light controller (134) arranged to receive a measured light value from a light sensor (127), to determine a light channel level value depending on the measured light value and a calibrated setpoint value if no power reduction parameter has been received, and to determine a light channel level value depending on the measured light value and a scaled calibrated setpoint value if the power reduction parameter has been received, the scaled calibrated setpoint value being equal to the calibrated setpoint value multiplied by the power reduction parameter. A load controller (135) is arranged to receive the light channel level value from the light controller, to determine an output level signal depending on the light channel level value if no power reduction parameter has been received and to determine a scaled output level signal if the power reduction parameter has been received, the scaled output level signal being equal to
(Continued)

the output level signal multiplied by the power reduction parameter, and to send the output level signal or the scaled output level signal to drivers of light sources of the lighting system.

9 Claims, 9 Drawing Sheets

(58) Field of Classification Search
USPC .................................. 315/149, 152, 307, 312
See application file for complete search history.

(56) References Cited

U.S. PATENT DOCUMENTS

| | | | | |
|---|---|---|---|---|
| 7,019,276 | B2* | 3/2006 | Cloutier | H05B 37/0254 |
| | | | | 250/214 AL |
| 8,159,150 | B2* | 4/2012 | Ashdown | H05B 33/0818 |
| | | | | 315/149 |
| 8,417,388 | B2* | 4/2013 | Altonen | E06B 9/68 |
| | | | | 160/5 |
| 2008/0088180 | A1 | 4/2008 | Cash et al. | |
| 2012/0143357 | A1* | 6/2012 | Chemel | F21V 23/0471 |
| | | | | 700/90 |
| 2013/0229115 | A1* | 9/2013 | Pandharipande | H05B 37/0218 |
| | | | | 315/152 |
| 2013/0293113 | A1* | 11/2013 | Morrow | H05B 37/02 |
| | | | | 315/149 |
| 2014/0191667 | A1* | 7/2014 | Glandt | H05B 33/0869 |
| | | | | 315/158 |

* cited by examiner

DEMAND RESPONSIVE LIGHTING CONTROL SYSTEM AND METHOD

FIELD OF THE INVENTION

The invention relates to a light control system and to a lighting system. The invention further relates to a method of operating such a light control system and to a computer program product for implementing the method.

BACKGROUND OF THE INVENTION

Automated Demand Response (ADR) is the response of the demand side, e.g. commercial building loads, to the request from the electrical grid to modify (typically to reduce) their electricity consumption. An ADR event may be called for an afternoon period, notified in advance before the start of the event. An event can last for several hours: 2-6 hours, determined by the grid operator. Since lighting is one of the major consuming loads during typical demand response event, it is common to reduce the lighting consumption for ADR purposes, along with other loads (notably the cooling load).

Demand Responsive lighting control, i.e. the lighting control mechanism to reduce lighting power consumption during ADR events, is mandated by the California energy code, Title 24 Part 6, for new buildings in California, as of July 2014.

Very frequently, the Automated Demand Response control will be an additional control to already existing lighting control mechanisms, such as occupancy control, user manual control, schedule-based control and daylight regulation control. As an ADR event may last for several hours, during which daylight condition and space occupancy may have multiple changes, it is required that consistent reduction can be achieved throughout despite all the changes. This means that the ADR control mechanism should not be overridden by other controls, and vice versa. Therefore, ADR control should not issue a dimming command, since (1) dimming command may be overridden by other controls, and (2) without the knowledge of dimming commands issued by other controls, ADR control may set a higher dimming level, which will increase consumption rather than decrease.

A simple ADR control mechanism that circumvents these disadvantages is letting ADR control change the maximum dim level, hence limiting the amount of power light sources can consume. This mechanism will deliver reduction if the prior consumption is higher than the reduced maximum dim level, but will not affect those that are lower.

A closed loop daylight regulation system interacting with an ADR regulation is described by Motegi, et al., *Introduction to Commercial Building Control Strategies and Techniques for Demand Response*, California Energy Commission, PIER, 2006, LBNL Report Number 59975, p 14-15. The system is configured to scale the dim level upon the start of an ADR event per an ADR signal. But as the target total illumination remains the same, after the dim level scaling, the daylight regulation control loop will attempt to increase the dim level, until the total illumination is back within the required level. This means that the dim level will go back to the approximately same level, or until it reaches the scaled maximum level. This means that if a prior dim level is less than the scaled maximum level, in principle, there will not be any reduction. In other words, any reduction occurrences would be mainly the result of how the prior and post scaling dim levels settled within the dead-band of the daylight regulation control, and will be marginal. If prior dim level is more than the scaled maximum dim level, the reduction is equal to the difference between the prior dim level and the scaled maximum level. Hence, the effect is similar to the limiting effect. The amount of reduction depends on the prior dim level, and it could actually result in no reduction at all.

Patent publication US 2008/088180 discusses a method of determining a setpoint of a load control device for controlling the amount of power delivered to an electrical load located in a space. The method comprises the steps of initially setting the value of the setpoint equal to a desired level; limiting the value of the setpoint to an occupied high-end trim if the space is occupied; limiting the value of the setpoint to a daylighting high-end trim determined by a daylighting procedure; and subsequently reducing the value of the setpoint in response to a load shed parameter. It is noted that scaling the set-point alone may not result in reduction, if the prior measured illumination due to combined daylight and artificial light is still within the dead-band of the new set-point. If any reduction is realized, the reduction will vary depending on the prior measured illumination, the scaling factor, and the width of the dead-band. This will not result in a predictable reduction.

SUMMARY OF THE INVENTION

It is an object of the invention to provide a demand responsive lighting control system which gives a more predictable reduction as compared to the state of the art systems.

For this purpose there is provided a light control system for controlling a lighting system, wherein the light control system is arranged to receive a power reduction parameter. The light control system comprises a light controller and a load controller. The light controller is arranged to receive a measured light value from a light sensor, to determine a light channel level value depending on the measured light value and a calibrated setpoint value if no power reduction parameter has been received, and to determine a light channel level value depending on the measured light value and a scaled calibrated setpoint value if the power reduction parameter has been received, the scaled calibrated setpoint value being equal to the calibrated setpoint value multiplied by the power reduction parameter.

The load controller is arranged to receive the light channel level value from the light controller, to determine an output level signal depending on the light channel level value if no power reduction parameter has been received, to determine a scaled output level signal if the power reduction parameter has been received, the scaled output level signal being equal to the output level signal multiplied by the power reduction parameter. The load controller is further arranged to send the output level signal or the scaled output level signal to drivers of light sources of the lighting system.

The combination of a set-point scaling by the light controller and a power scaling by the load controller gives a guaranteed reduction with respect to "would-be" (in the absence of reduction) light output. The light controller and the load controller may be separate modules, but they may be part of a single module as well. Alternatively, the light controller may be part of a light sensor module. A light sensor and the light controller may be arranged on the same circuit board and housed in a single enclosure. The load controller may then be a separate device.

There is further provided a lighting system comprising a light control system as described above and a light sensor module, the light sensor module comprising the light controller and a photo sensor.

There is further provided a method of operating a light control system for controlling a lighting system, the method comprising:
- receiving a measured light value from a light sensor;
- determining a light channel level value depending on the measured light value and a calibrated setpoint value if no power reduction parameter has been received;
- determining a light channel level value depending on the measured light value and a scaled calibrated setpoint value if the power reduction parameter has been received, the scaled calibrated setpoint value being equal to the calibrated setpoint value multiplied by the power reduction parameter;
- determining an output level signal depending on the light channel level value if no power reduction parameter has been received;
- determining a scaled output level signal if the power reduction parameter has been received, the scaled output level signal being equal to the output level signal multiplied by the power reduction parameter, and
- sending the output level signal or the scaled output level signal to drivers of light sources of the lighting system.

There is further provided a computer program product downloadable from a network and/or stored on a computer-readable medium and/or microprocessor-executable medium, the product comprising program code instructions for implementing a method as described above.

A method according to the invention may be implemented on a computer as a computer implemented method, or in dedicated hardware, or in a combination of both. Executable code for a method according to the invention may be stored on a computer program product. Examples of computer program products include memory devices such as a memory stick, optical storage devices such as an optical disc, integrated circuits, servers, online software, etc. The computer program product may comprise non-transitory program code means stored on a computer readable medium for performing a method according to the invention when said program product is executed on a computer. In an embodiment, the computer program comprises computer program code means adapted to perform all the steps or stages of a method according to the invention when the computer program is run on a computer. Preferably, the computer program is embodied on a computer readable medium. There is provided a computer program product downloadable from a network and/or stored on a computer-readable medium and/or microprocessor-executable medium, the product comprising program code instructions for implementing a method as described above when executed on a computer.

Further preferred embodiments of the devices and methods according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The FIGS. 9 and 10 show the normalized light output as a function of time.

The figures are purely diagrammatic and not drawn to scale. In the Figures, elements which correspond to elements already described may have the same reference numerals.

DETAILED DESCRIPTION OF EMBODIMENTS

Figure 1:
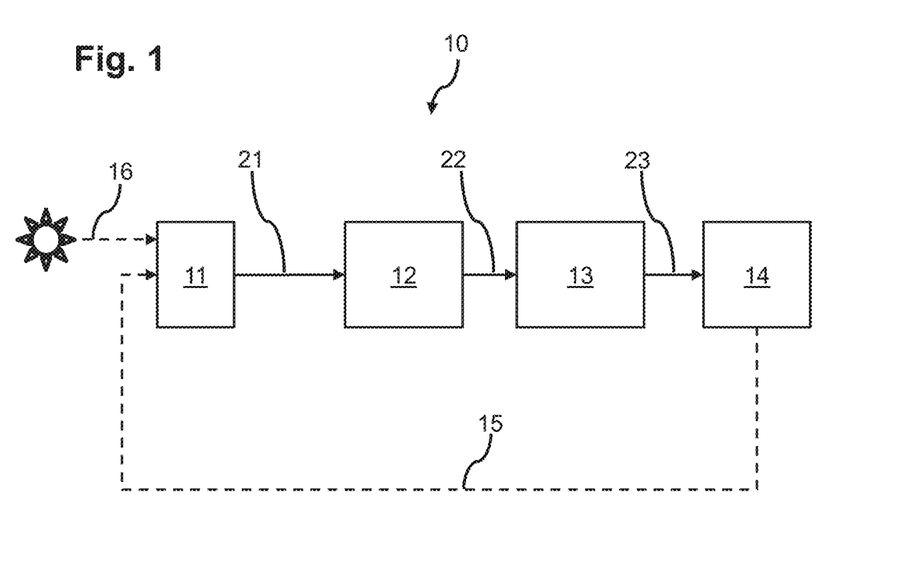
FIG. 1 shows a simple example of a state of the art closed-loop daylight regulation system.

A simple example of a state of the art closed-loop daylight regulation system 10 is shown in FIG. 1. The daylight regulation system 10 comprises a light sensor 11, a light controller 12, a load controller 13 and a light source 14. In this simple example only one light source is present, but it is clear to the skilled reader that normally more than one light source is controlled. Furthermore, it is noted that the light sensor 11 and the light controller 12 could be part of a single sensor module. The light sensor 11 and the light source 14 are typically installed in one and the same space (i.e. a room). The light sensor 11 receives light from the light source 14, see dashed line 15, and daylight (DL) coming in into the space, see dashed line 16. The light sensor 11 will sense a total of the artificial light 15 and the daylight 16.

The light sensor 11 will produce a variable output value 21 also referred to as MeasuredLux (t) which is a function of time t. The MeasuredLux (t) signal is input for the light controller 12. The light controller 12 is arranged to produce a light channel level value 22 also referred to as the LightChannelLevel(t) which is also a function of t. The LightChannelLevel(t) signal is input for the load controller 13 which will produce an output level signal 23 for the light source 14, which signal is referred to as LightOutput(t).

Figure 2:
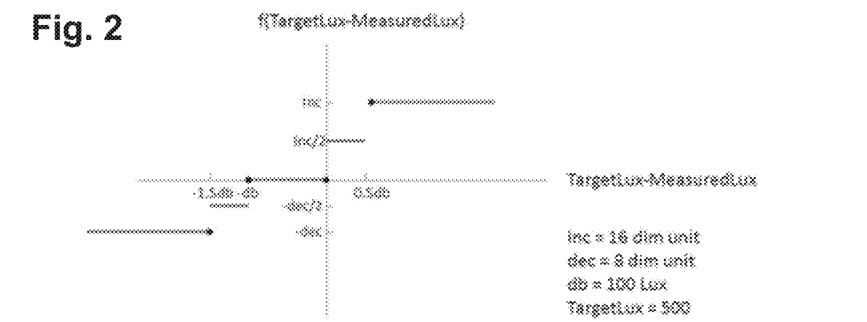
FIG. 2 shows a graph of a possible regulation function f( ) of the light controller.

FIG. 2 shows a graph of a possible regulation function f( ) of the light controller 12. The regulation function f( ) may be implemented in the light controller 12 to determine whether to increase or decrease the channel level in response to changing measured illuminance. The horizontal axis in FIG. 2 represents a difference between a target value and a measured value, i.e. TargetLux−MeasuredLux. The regulation function f( ) is equal to zero in a deadband db. In this case, the deadband is 100 Lux.

Between −db and −1.5 db the value is −dec/2, where dec is a decrement value equal to a certain number of dim units, for example 8 dim units. A "dim unit" is defined as the smallest increment/decrement of dimming step achievable by the system. Below −1.5 db, the function is −dec. Between 0 and 0.5 db the function is equal to inc/2, where inc is an increment value equal to a certain number of dim units, for example 16 dim units. Above 0.5 db, the function is equal to inc. It is noted that the increase and decrease of the channel level is delimited by a maximum and a minimum channel level.

The closed-loop daylight regulation system 10 shown in FIG. 1 will reach a steady state due to the feedback loop. In the following it is assumed that only one single light source 14 is present. Assuming the daylight regulation loop is calibrated for SetPointCal lux at LightChannelCal light level and TargetLux=SetPointCal, then $$\text{MeasuredLux}(t) = DL(t) + \text{LightChannelLevel}(t) / \text{LightChannelCal} * \text{SetPointCal} \qquad [1]$$

with

DL(t) is the daylight contribution sensed by the light sensor 11 at time t,
MeasuredLux(t) the overall light level at time t, combining daylight 16 and electric light 15 measured by the light sensor 11,
LightChannelLevel(t) the light channel level determined by the light controller 12 at time t,
LightChannelCal the light channel level determined by the light controller 12 during calibration/commissioning process when the controlled space is kept at the desired (targeted) light level, and
SetPointCal the desired light level in the controlled space.

The loop in FIG. 1 reaches steady state at t' when:

$$-db <= \text{TargetLux} - \text{MeasuredLux}(t') <= 0 \qquad [2]$$

This results in formula [3]:

$$\left(1 - \frac{DL(t')}{SetPointCal}\right) \times LightChannelCal \le$$
$$LightChannelLevel(t') \le \left(1 - \frac{DL(t') - db}{SetPointCal}\right) \times LightChannelCal$$

This range consists of two ranges, formula [4] and [5]:

$$LightChannelCal \times \left(1 - \frac{DL(t') - db}{SetPointCal}\right) - \frac{dec}{2} <$$
$$LightChannelLevel(t') \le LightChannelCal \times \left(1 - \frac{DL(t') - db}{SetPointCal}\right)$$

AND $$LightChannelCal \times \left(1 - \frac{DL(t')}{SetPointCal}\right) \le LightChannelLevel(t') <$$
$$LightChannelCal \times \left(1 - \frac{DL(t')}{SetPointCal}\right) + \frac{inc}{2}$$

The first range means that in order not for LightChannelLevel(t') to continue to decrease another designated step, namely, dec/2, it will be bounded by the upper bound and dec/2 in the steady state. Similarly, the second range shows that in order not for LightControlLevel(t') to continue to increase another designated step, namely, inc/2, it will be bound by the lower bound and inc/2.

In case of a demand response event, the daylight regulation system 10 will receive a power reduction value alpha (also referred to as scaling factor). The scaling factor alpha in the equation scales the electric light output level LightOutput, and may be derived from a predicted or a predefined correlation between electric light output level and power consumption.

Applying "alpha" only to the values of LightChannelLevel(t) will result in a non-optimal method and device as will be discussed below, see case 1.

Case 1: Scale the Channel Level Only

Applying the scaling factor alpha to the electric light level is equivalent to:

$$\text{MeasuredLux}(t_0+1) = DL(t_0+1) + \\ alpha * \text{LightChannelLevel}(t_0+1) / \\ \text{LightChannelCal} * \text{SetPointCal} \qquad [6]$$

The loop in FIG. 1 reaches steady state at t' when:

$$-db <= \text{TargetLux} - \text{MeasuredLux}(t') <= 0 \qquad [7]$$

This results in formula [8]:

$$\frac{1}{alpha} \times \left(1 - \frac{DL(t')}{SetPointCal}\right) \times LightChannelCal \le$$
$$LightChannelLevel(t') \le \frac{1}{alpha} \times \left(1 - \frac{DL(t') - db}{SetPointCal}\right) \times LightChannelCal$$

and:

$$LightOutput(t') = alpha * LightChannelLevel(t') \qquad [9]$$

The steady state light output LightOutput(t') will not be higher than alpha*maximum light output. Note that unless it is capped, the range for LightOutput($t_0$) and LightOutput(t') are the same. Any reduction $\Delta$ is due to LightOutput($t_0$) and LightOutput(t') settling into the deadband at a different value within the range, independent of the scaling factor alpha, see formula [10] below:

$$-\frac{inc}{2} < \Delta \le \frac{db * LightChannelCal}{SetPointCal}$$

with
inc the allowable increment step in the regulation function f( ) in FIG. 2,
db the deadband in the regulation function f( ) of the light controller,
LightChannelCal the light channel level determined by the light controller 12 during calibration/commissioning process when the controlled space is kept at the desired (targeted) light level, and
SetPointCal the desired light level in the controlled space.

Figure 3:
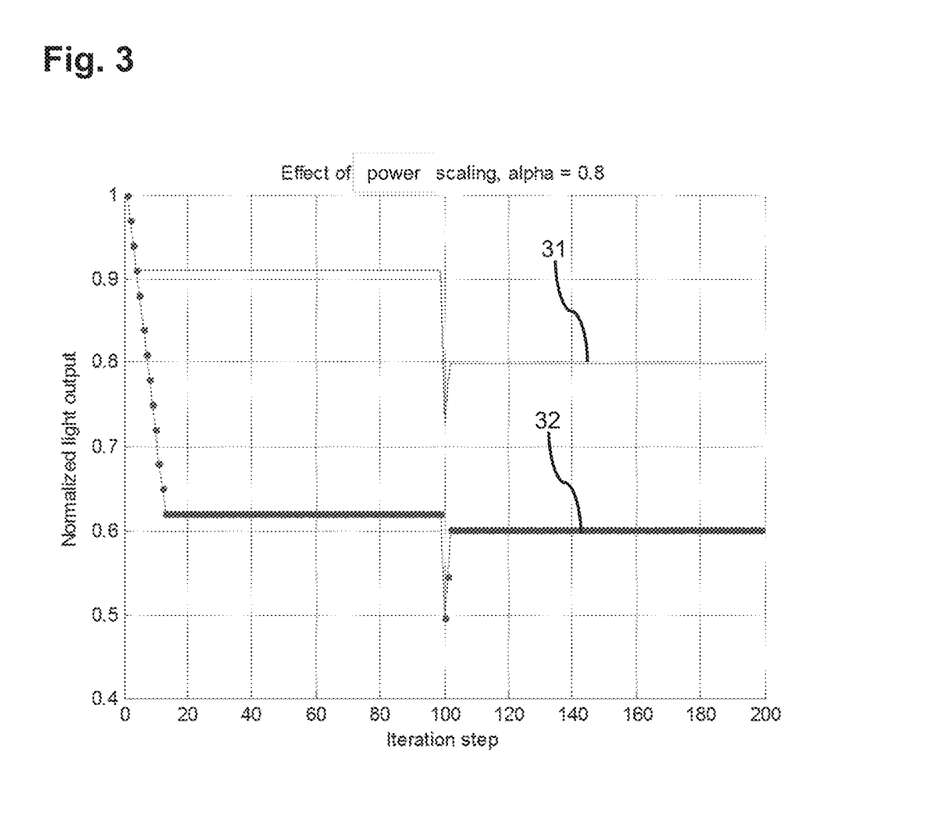
FIG. 3 shows a graph of the normalized light output resulting from several simulations performed by the inventors.

FIG. 3 shows a graph of the normalized light output resulting from several simulations performed by the inventors. A first line 31 indicates the normalized light output as a function of time (i.e. iteration steps). In this example, the scaling factor was 0.8. As can be seen, the output was about 0.91 before a simulated reduction request, and after the abrupt change due to the request, the output is about 0.8 which is equal to 0.8*max light output. As a result the actual reduction is about 0.11, i.e. 11%, in this case and not the requested 20%. A second line 32 indicates the normalized light output where the output is about 0.62 before the reduction request and about 0.6 after the request. As can be seen in FIG. 3, the daylight regulation algorithm gradually brings back the (normalized) light level. The resulting light level difference in line 32 results from the presences of the deadband db, see also FIG. 2. The actual reduction in line 32 is about 0.02, i.e. 2%.

Now, the disadvantage of applying "alpha" only to TargetLux(t) will briefly be discussed with reference to a case 2.

Case 2: Scale the Daylight Regulation Setpoint Only

Instead of scaling the channel level output, alternatively the setpoint at the light controller 12 could be scaled after receipt of a reduction request. In the following discussion the scaling factor alpha is applied to TargetLux at time $t_0+1$:

$$\text{TargetLux}(t_0)=\text{SetPointCal} \qquad [11]$$

$$\text{TargetLux}(t_0+1)=\text{alpha}*\text{SetPointCal} \qquad [12]$$

The LightChannelLevel will reach the steady-state at t' after application of set-point scaling.
The steady state condition, $$-db \leq \text{TargetLux}-\text{MeasuredLux}(t') \leq 0 \qquad [13],$$

becomes $$-db \leq \text{alpha}*\text{SetPoinCal}-\text{MeasuredLux}(t') \leq 0 \qquad [14]$$

Replacing MeasuredLux(t') with the value in formula [1] will result in the following range for LightChannelLevel(t'), see formula [15] below:

$$\left(\text{alpha}-\frac{DL(t')}{SetPointCal}\right) \times LightChannelCal \leq$$

$$LightChannelLevel(t') \leq \left(\text{alpha}-\frac{DL(t')-db}{SetPointCal}\right) \times LightChannelCal$$

For db=0 and a constant daylight DLcont, it follows that:

$$LightChannelLevel(t') = \left(\text{alpha}-\frac{DLcont}{SetPointCal}\right) \times LightChannelCal \qquad [16]$$

As a result, the reduction Δ is $$\Delta=(1-\text{alpha})*LightChannelCal \qquad [17]$$

For db>0 and constant daylight, it follows that:
If SetPointCal ≤ MeasuredLux($t_0$) ≤ alpha*SetPointCal+db
then $$LightChannelLevel(t')=LightChannelLevel(t_0) \qquad [18]$$

(which means that the reduction is equal to 0)
and otherwise $$LightChannelCal \times \left(\text{alpha}-\frac{DLcont-db}{SetPointCal}\right) - \frac{dec}{2} < \qquad [19]$$

$$LightChannelLevel(t') \leq LightChannelCal \times \left(\text{alpha}-\frac{DLcont-db}{SetPointCal}\right)$$

For the overall reduction it follows that:

$$0 \leq \Delta < (1-\text{alpha})LightChannelCal+\frac{dec}{2} \qquad [20]$$

Figure 4:
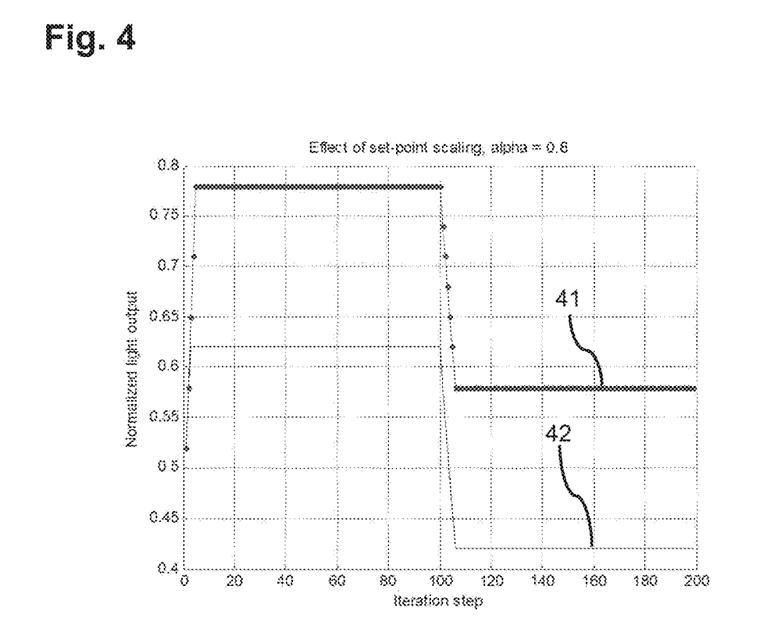
FIGS. 4 and 5 show graphs of the normalized light output resulting from several further simulations performed by the inventors.
Figure 5:
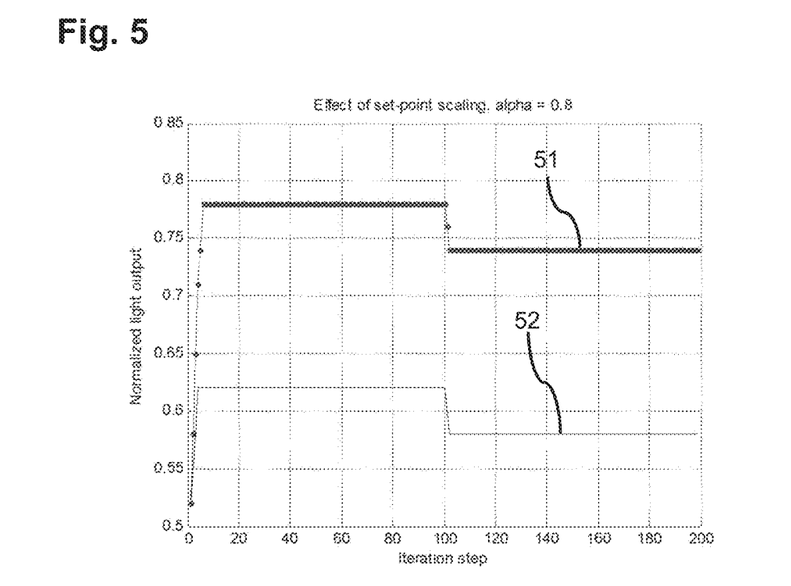

FIGS. 4 and 5 shows graphs of the normalized light output resulting from several further simulations performed by the inventors. The lines in the graphs indicate the normalized light output as a function of time (i.e. iteration steps) with a scaling factor alpha=0.8. In FIG. 4 the deadband is 20 lux and the daylight=0.25*SetPointCal, see line 41, and daylight=0.42*SetPointCal, see line 42. The achieved reduction in both cases is about 0.2, which is the requested reduction. In FIG. 5 the deadband is 100 lux and the daylight=0.25*SetPointCal, see line 51, and daylight=0.42*SetPointCal, see line 52. The achieved reduction in both cases of FIG. 5 is only 0.04, which is far less than what was requested (i.e. 0.2).

Figure 6:
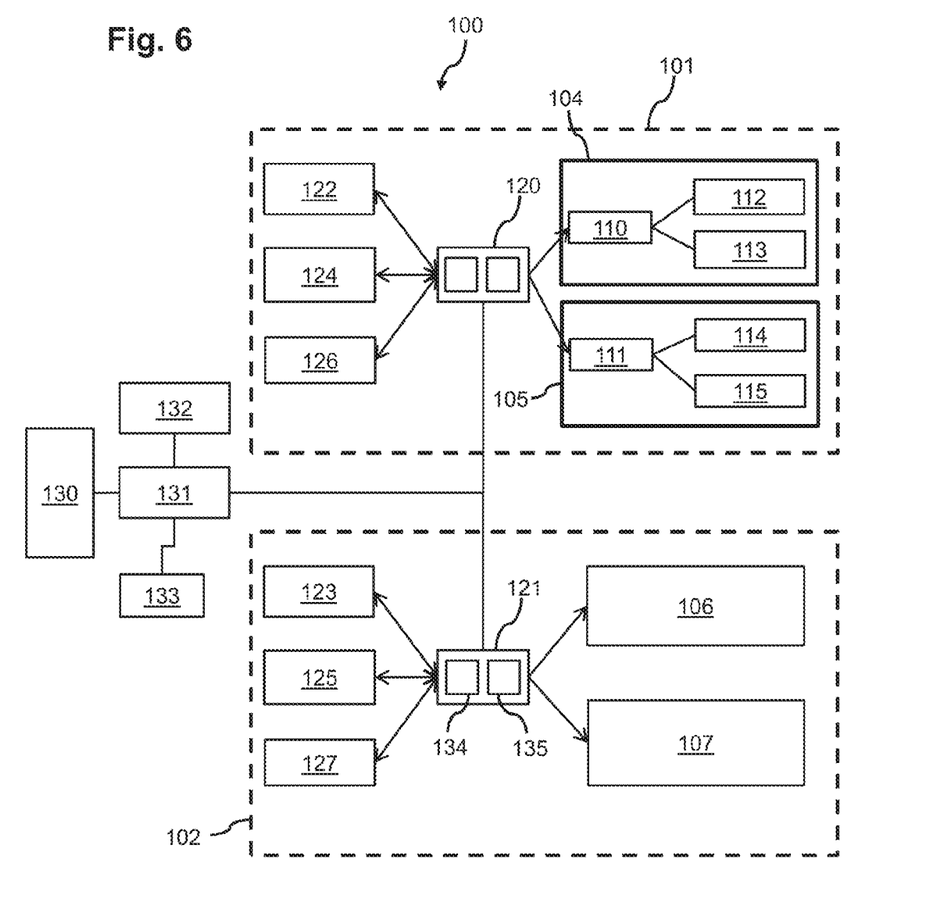
FIG. 6 schematically shows a lighting system according to an embodiment.

FIG. 6 schematically shows a lighting system 100 according to an embodiment. The lighting system 100 comprises equipment for lighting two separate spaces (e.g. rooms) 101, 102. The lighting system 100 comprises a number of light fixtures 104,105,106,107 each of which comprise a driver 110, 111 and a number of light sources 112, 113, 114, 115. For simplicity, the light sources in room 102 are not shown.

The lighting system 100 in this embodiment further comprises two light control systems 120, 121. Each of the light control systems 120, 121 receive input from a user dimmer 122,123, from an occupancy sensor 124,125 and from a light sensor 126,127.

In FIG. 6 also an ADR signaling server 130 and DR controller 131, a manual DR switch 132 and a BMS (Building Management System) 133 are depicted. The DR controller 131 may receive signals from the ADR signaling server 130, the manual DR switch 132 and/or from the BMS 133 depending on the application. The DR controller 131 will send a power reduction signal to the lighting control systems 120, 121. Each of the lighting control systems is arranged to receive a reduction parameter (a) which may be presented in the power reduction signal. Each of the light control systems 120, 121 comprises a light controller 134 and a load controller 135. According to an embodiment, the light controller 134 is arranged to:
- receive a measured light value from a light sensor,
- determine a light channel level value depending on the measured light value and a calibrated setpoint value if no power reduction parameter has been received, and
- determine a light channel level value depending on the measured light value and a scaled calibrated setpoint value if the power reduction parameter has been received, the scaled calibrated setpoint value being equal to the calibrated setpoint value multiplied by the power reduction parameter;

The load controller 135 is arranged to:
- receive the light channel level value from the light controller,
- determine an output level signal (also referred to as dimming command) depending on the light channel level value if no power reduction parameter has been received and
- determine a scaled output level signal if the power reduction parameter has been received, the scaled output level signal being equal to the output level signal multiplied by the power reduction parameter, and
- send the output level signal or the scaled output level signal to drivers of light sources of the lighting system.

In the discussion of the embodiments below, it is assumed that the light controller 134 is configured to implement the daylight regulation algorithm as shown in FIG. 2. However it is noted that other regulation algorithms could be used.

If the measured light level is already within the scaled setpoint SetPointCal after alpha is applied, i.e. the daylight regulation algorithm will not be active, and only the channel level scaling will be active. In that case, the scaled output level signal is determined by the light control system 120; 121 using:

If $$\text{SetPointCal} \leq \text{MeasuredLux}(t_0) \leq \text{alpha}*\text{SetPointCal}+db$$

OR $$\text{MeasuredLux}(t_0+1) \le \text{alpha}*\text{SetPointCal}+db \quad [21]$$

then $$\text{LightChannelLevel}(t') = \text{LightChannelLevel}(t_0) \quad [22]$$

$$\text{Lightoutput}(t') = \text{alpha}*\text{LightChannelLevel}(t') \quad [23]$$

where
db is the deadband of a regulation algorithm implemented by the light controller 134,
SetPointCal is the desired light level in the controlled space,
MeasuredLux($t_0$) is the overall light level at time $t_0$, combining daylight and electric light measured by the light sensor 127,
MeasuredLux($t_0$+1) is the overall light level at time $t_0$+1 after receiving the reduction parameter alpha, combining daylight and electric light measured by the light sensor 127,
LightChannelLevel(t') is the light channel level determined by the light controller 134 at the steady state t',
LightChannelLevel($t_0$) is the light channel level determined by the light controller 134 at time $t_0$ before receiving the reduction parameter alpha, and
Lightoutput(t') is the light output signal at the steady state t'.

In this case of the achieved reduction is equal to (1−alpha)*LightChannelLevel($t_0$).

If the measured light level is greater than the setpoint SetPointCal after alpha is applied, both the daylight regulation algorithm and channel level scaling will be active. The light control system 120;121 may be configured to implement the following formulas for this situation:

$$\text{MeasuredLux}(t_0+1) > \text{alpha}*\text{SetPointCal}+db \quad [24]$$

and (see [25] below)

$$LightChannelCal \times \left(alpha - \frac{DL-db}{SetPointCal}\right) - \frac{dec}{2} <$$

$$LightOutput(t') \le LightChannelCal \times \left(alpha - \frac{DL-db}{SetPointCal}\right) \quad [40]$$

with
LightChannelCal is the light channel level determined by the light controller 134 during calibration/commissioning process when the controlled space is kept at the desired (targeted) light level,
alpha is the power reduction factor,
db is the deadband of a regulation algorithm implemented by the light controller 134,
DL is the daylight level in the steady state,
dec is the allowable decrement step in the regulation function f( ) in FIG. 2,
SetPointCal is the desired light level in the controlled space, and
Lightoutput(t') is the light output signal from the load controller 135 at the steady state t'.

It is noted that if $$\text{LightOutput}(t') > \text{alpha}*\text{LightChannelLevel}(t_0)$$

an overall range of reduction can be achieved of, [26]:

$$(1-\text{alpha}) \times LightChannelLevel(t_0) \le$$

$$\Delta < (1-\text{alpha}) \times LightChannelCal + \frac{dec}{2}$$

Hence, by combining channel level scaling and set-point scaling, a reduction of at least (1−alpha)*LightChannelLevel($t_0$) is guaranteed.

Figure 7:
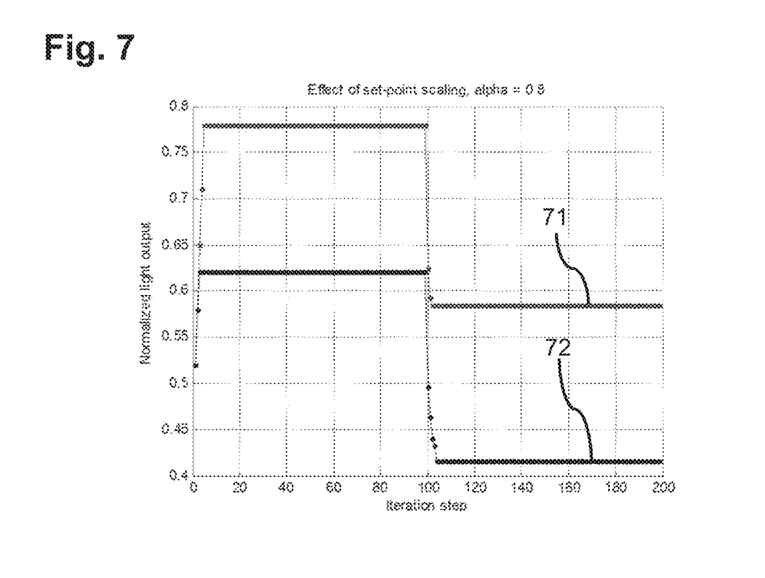
FIGS. 7 and 8 show graphs of the normalized light output as a function of time.
Figure 8:
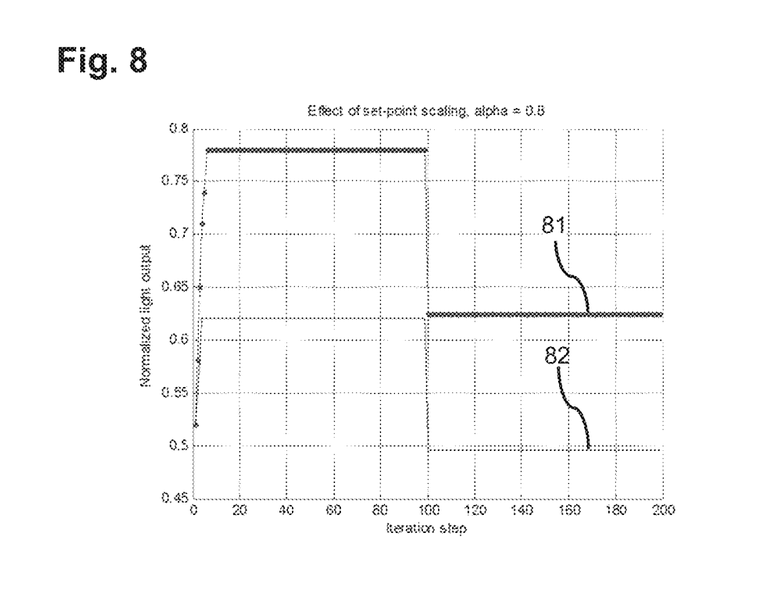

FIGS. 7 and 8 show graphs of simulations performed by the inventors. The FIGS. 7 and 8 shows the normalized light output as a function of time. In both figures the power reduction factor is 0.8. In FIG. 7 the deadband was set to 20 lux and in FIG. 8 the deadband was set to 100 lux. In FIG. 7 a first line 71 represents the results with the daylight being equal to 0.25*SetPointCal, and a line 72 represent the results with the daylight being equal to 0.42*SetPointCal. In FIG. 8 a first line 81 represents the results with the daylight being equal to 0.25*SetPointCal, and a line 82 represent the results with the daylight being equal to 0.42*SetPointCal.

As can be derived for the simulations in FIGS. 7 and 8, the absolute reduction is 0.1960 in line 71, which is slightly greater than 20% of the starting value of 0.78 normalized light output before alpha=0.8 is applied. In other words, the requested 20% reduction is achieved. Similarly, the absolute reduction is 0.2040 in line 72, which is greater than the requested 20% of the starting value of 0.62. The absolute reduction is 0.1560 in line 81, which is 20% of the starting value of 0.78 before alpha=0.8 is applied; similarly, the absolute reduction is 0.1240 in line 82, which is 20% of the starting value of 0.62 before alpha=0.8 is applied. All these reduction values result in the requested power reduction of 0.8 or greater.

In the embodiments discussed above, the output from the light controller LightChannelLevel($t_0$+1), hence the light output level LightOutput($t_0$+1) is scaled by alpha immediately after alpha is applied, and the daylight regulation algorithm will take over and bring the light level to the steady state at the scaled setpoint, i.e. alpha*SetPointCal. In other words, there may always be an initial abrupt light level change, (see the big drop between the two data points at the 100th (right before alpha is applied) and the immediate next (101st) iteration step (right after alpha is applied) in lines 71 and 72 in FIG. 7, which may be noticeable and even annoying to the users.

To also solve this issue, a further embodiment is provided. In this embodiment the channel level scaling in the load controller 135 is reduced in uniform small steps (termed "fading") while the scaling of set-point in the light controller 134 may be applied immediately.

In an embodiment, fading may be realized using the equation below.

$$\text{LightOutput}(t+1) = \text{LightOutput}(t) - \\ (\text{FadeStepPower}*\text{LightChannelLevel}(t) + \\ \text{FadeStepDL}(t)*\text{alpha}) \quad [27]$$

with

LightOutput(t): output level signal from the load controller 135 at step t,

FadeStepDL(t): fade step of daylight regulation at step t,

FadeStepPower: fade step of the power reduction factor, alpha: power reduction factor.

If the measured light level is already within the scaled setpoint SetPointCal after alpha is applied, i.e. the daylight regulation algorithm may not be active, and only the channel level scaling may be active. In other words:

If $$\text{SetPointCal} \le \text{MeasuredLux}(t_0) \le \text{alpha}*\text{SetPointCal}+db \quad [28]$$

then the fading equation above reduces to

LightOutput(*t*+1)=LightOutput(*t*)−
FadeStepPower*LightChannelLevel(*t*)     [29]

until light output reaches steady state,

LightChannelLevel(*t'*)=LightChannelLevel(*t₀*)=Light-
ChannelLevel(*t*)     [30]

LightOutput(*t'*)=alpha*LightChannelLevel(*t'*)     [31]

Now the reduction is equal to (1−alpha)*LightChannelLevel($t_0$), which is the same reduction as if there is no fading. The only difference is that it takes longer time for the light level to reach steady state. Without fading, the light level reaches the steady state in one shot, i.e. LightOutput(t')=LightOutput($t_0$+1)=alpha*LightChannelLevel($t_0$+1). With fading, time t' when the light level reaches the steady state LightOutput(t') may be longer than $t_0$+1, and the exact value of t' depending on how big the fixed fading step (FadeStepPower) is.

Otherwise, if the measured light level is greater than the setpoint SetPointCal after alpha is applied, both the daylight regulation algorithm and channel level scaling may be active, i.e.
if alpha*SetPointCal+db<MeasuredLux($t_0$)     [32]

the light output at the steady-state condition is imposed by the daylight regulation, [33]:

$$LightChannelCal \times \left(alpha - \frac{DL}{SetPointCal}\right) \leq$$
$$LightOutput(t') \leq LightChannelCal \times \left(alpha - \frac{DL-db}{SetPointCal}\right)$$

and by the channel level scaling:

LightOutput(*t'*)≤alpha*LightChannelLevel($t_0$)     [34]

Hence it follows that [35]:

$$LightChannelCal \times \left(alpha - \frac{DL}{SetPointCal}\right) \leq$$
$$LightOutput(t') \leq alpha * LightChannelLevel(t_0)$$

The overall reduction will be [36]:

$$(1 - alpha) \times LightChannelLevel(t_0) \leq \Delta \leq$$
$$(1 - alpha) \times LightChannelCal + db \frac{LightChannelCal}{SetPointCal}$$

The original steady state LightOutput(t') without the power reduction scaling alpha will be no greater than $$\left(1 - \frac{DL-db}{SetPointCal}\right) \times LightChannelCal, \text{ i.e.}$$ [37]
$$LightOutput(t') \leq \left(1 - \frac{DL-db}{SetPointCal}\right) \times LightChannelCal$$

This is part of the inequality, see formula [3]. Note that in this case LightChannelLevel(t')=LightOutput(t') since there is no power scaling factor alpha.

With power scaling factor alpha and with channel level fading, the steady state LightOutput(t') will be lower-bounded by:

$$LightChannelCal \times \left(alpha - \frac{DL}{SetPointCal}\right) \leq LightOutput(t')$$ [38]

This is part of the inequality in formula [36].

Combining the two inequalities above to find the reduction Δ, the upper bound will be the difference between the two bounds without and with alpha applied, i.e.

$$\left(1 - \frac{DL-db}{SetPointCal}\right) \times LightChannelCal -$$ [37]
$$LightChannelCal \times \left(alpha - \frac{DL}{SetPointCal}\right) =$$
$$(1 - alpha) \times LightChannelCal + db \frac{LightChannelCal}{SetPointCal}$$

and the lower bound will be (1−alpha)×LightChannelLevel($t_0$) [38] if the effect of channel level scaling is more significant effect than the effect of daylight regulation.

So this is the same minimum guaranteed reduction as without fading, while the highest reduction can be larger in comparison to without fade case is achieved.

Figure 9:
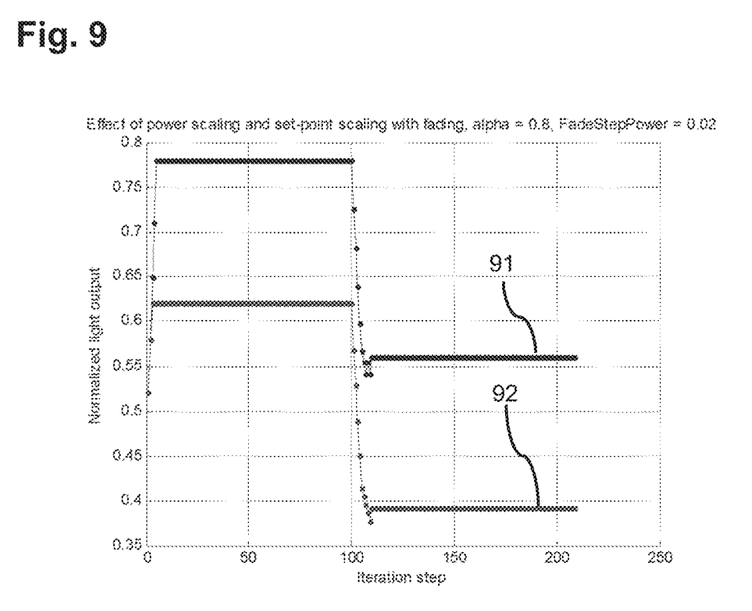
Figure 10:
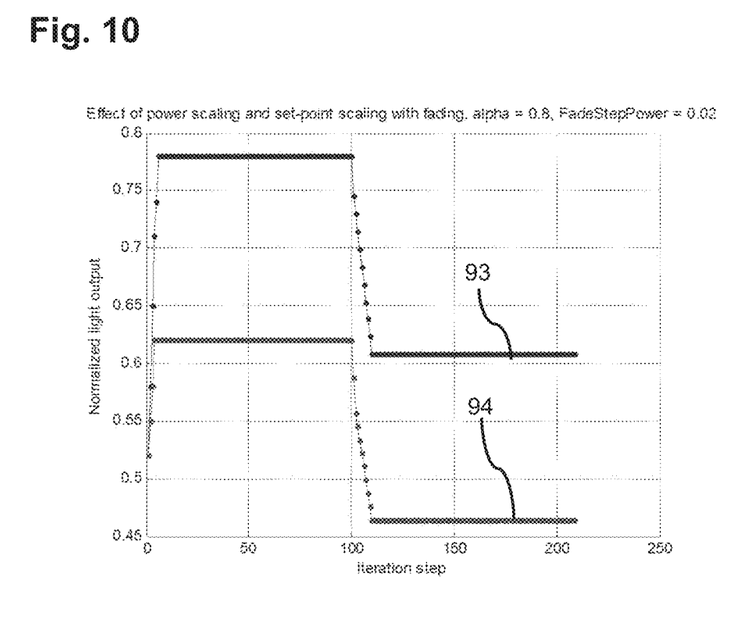

FIGS. 9 and 10 show graphs of further simulations performed by the inventors. The FIGS. 9 and 10 show the normalized light output as a function of time. In both figures the power reduction factor is 0.8 and a value for a parameter FadeStepPower=0.02). In FIG. 9 the deadband was set to 20 lux and in FIG. 10 the deadband was set to 100 lux. In FIG. 9 a first line 91 represents the results with the daylight being equal to 0.25*SetPointCal, and a line 92 represent the results with the daylight being equal to 0.42*SetPointCal. In FIG. 10 a first line 93 represents the results with the daylight being equal to 0.25*SetPointCal, and a line 94 represent the results with the daylight being equal to 0.42*SetPointCal. As can be derived for the simulations in FIGS. 9 and 10, the absolute reduction is 0.2200 in line 91 (equivalent to a 28% reduction from the original level of 0.78 normalized light output before alpha is applied), the absolute reduction is 0.2288 in line 92 (equivalent to a 37% reduction from the original level of 0.62), the absolute reduction is 0.1720 in line 93 (equivalent to a 22% reduction from the original level of 0.78), and the absolute reduction is 0.1560 in line 94 (equivalent to a 25% reduction from the original level of 0.62). All these reduction values result in the requested power reduction of 0.2 (or 20%) in response to the scaling factor alpha=0.8.

Figure 11:
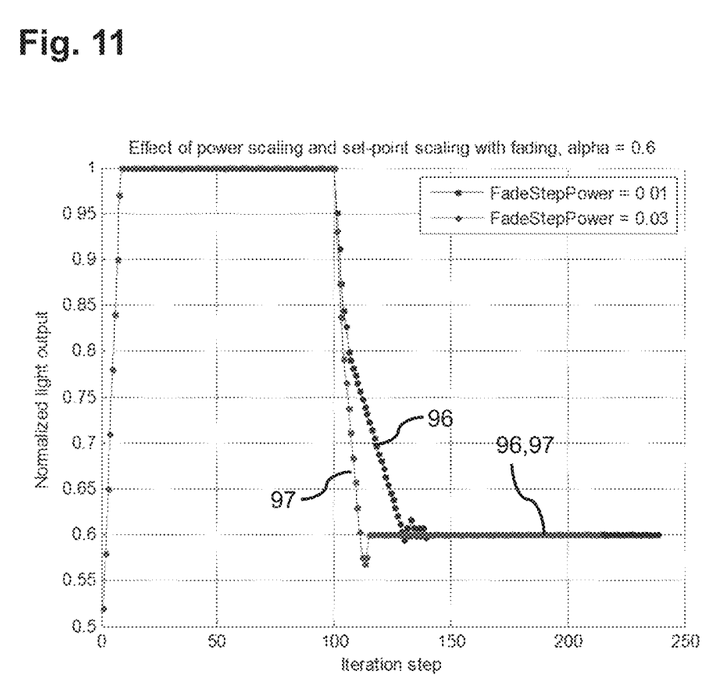
FIG. 11 shows the effect of channel level scaling and setpoint scaling with the fading.

In an embodiment, the daylight regulation in the light controller 134 will fade the LightChannelLevel at the same time as the load controller 135 fades the power scaling. The daylight regulation may fade until Measured Lux(t)≤alpha*SetPointCal+db and the channel level scaling will fade until the intended channel level scaling is reached. As a result, the light output will decrease gradually in non-uniform steps, larger step at the start of fade, until one of the fades stops. FIG. 11 shows the effect of channel level scaling and setpoint scaling with the fading as described above. Line 96 represents the normalized output with fadeStepPower equal to 0.01 and line 97 represents the normalized output with fadeStepPower equal to 0.03. As can be seen from line 96 the light output decreases linearly after about iteration step 110 because daylight regulation reaches steady state. Between iteration step 100 and 110 the light output decreases quadratically because of both fadings.

In an embodiment, the difference between the light output of two consecutive steps is:

$$\text{LightOutput}(n) - \text{LightOutput}(n+1) = \text{FadeStepPower} * \text{LightChannelLevel}(n) + \text{FadeStepDL}(n) * \text{alpha} \qquad [39]$$

where

LightOutput(n) is the light output at step n

FadeStepDL(n) is the fade step of daylight regulation at step n

FadeStepPower is the fade step of the power factor alpha(n): power factor at step n In an embodiment, a value for the parameter FadeStepPower is half the size of a daylight regulation fading step size used by the light controller. This will ensure overall stability of the system behaviour while arriving at the new reduced level with a reasonable speed. In case the daylight regulation of FIG. 2 is implemented, possible values for FadeStepDL(n) are 0, −dec, −dec/2, inc/2, inc.

Figure 12:
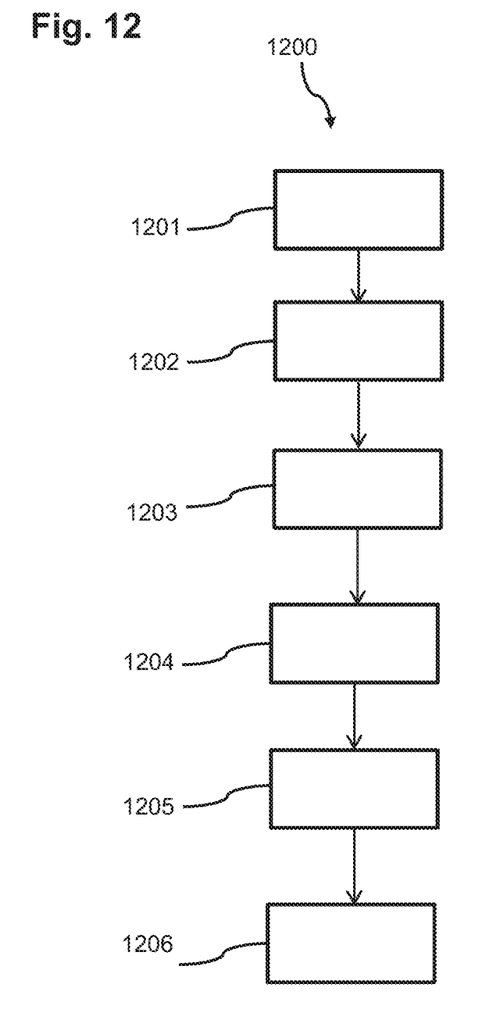
FIG. 12 shows a flow chart of a method of operating a light control system for controlling a lighting system according to an embodiment.

FIG. 12 shows a flow chart of a method 1200 of operating a light control system for controlling a lighting system according to an embodiment. The method 1200 comprises receiving 1201 a measured light value from a light sensor, determining 1202 a light channel level value depending on the measured light value and a calibrated setpoint value if no power reduction parameter has been received, and determining 1203 a light channel level value depending on the measured light value and a scaled calibrated setpoint value if the power reduction parameter has been received, the scaled calibrated setpoint value being equal to the calibrated setpoint value multiplied by the power reduction parameter. Furthermore the method comprises determining 1204 an output level signal depending on the light channel level value if no power reduction parameter has been received, and determining 1205 a scaled output level signal if the power reduction parameter has been received, the scaled output level signal being equal to the output level signal multiplied by the power reduction parameter. Finally, the method comprises sending 1206 the output level signal or the scaled output level signal to drivers of light sources of the lighting system.

Figure 13A:
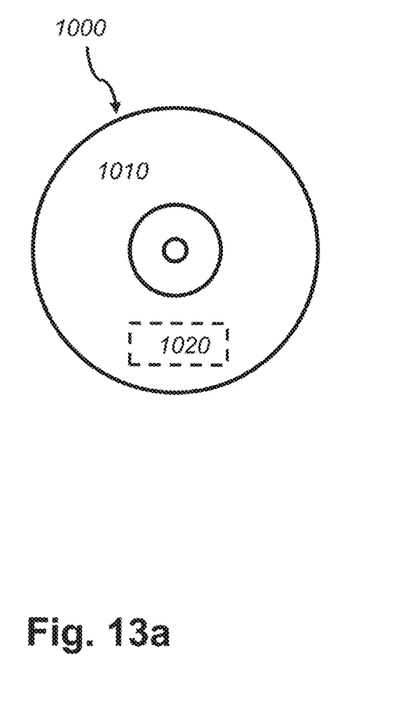
FIG. 13a shows a computer readable medium.

FIG. 13a shows a computer readable medium 1000 having a writable part 1010 comprising a computer program 1020, the computer program 1020 comprising instructions for causing a processor system to perform one or more of the above methods in the system as described with reference to FIGS. 6 and 12. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said methods.

Figure 13B:
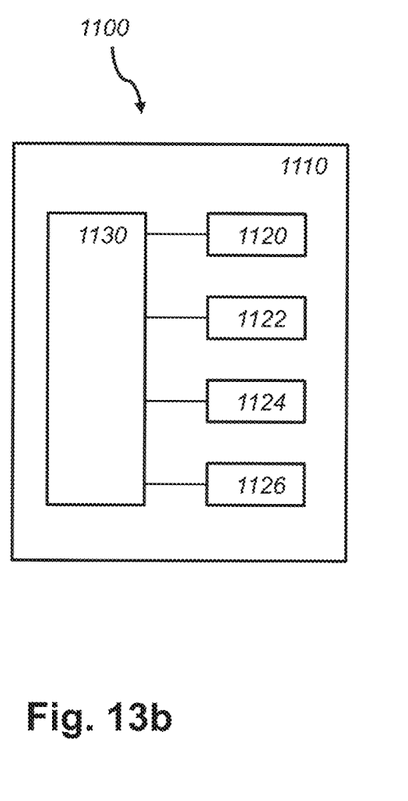
FIG. 13b shows in a schematic representation of a processor system.

FIG. 13b shows in a schematic representation of a processor system 1100 according to an embodiment of the control system as described with reference to FIG. 6. The processor system comprises one or more integrated circuits 1110. The architecture of the one or more integrated circuits 1110 is schematically shown in FIG. 13b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

In summary, there is provided a light control system for controlling a lighting system. The light control system is arranged to receive a power reduction parameter (alpha). The light control system comprising a light controller arranged to receive a measured light value from a light sensor, to determine a light channel level value depending on the measured light value and a calibrated setpoint value if no power reduction parameter has been received, and to determine a light channel level value depending on the measured light value and a scaled calibrated setpoint value if the power reduction parameter has been received, the scaled calibrated setpoint value being equal to the calibrated setpoint value multiplied by the power reduction parameter. A load controller is arranged to receive the light channel level value from the light controller, to determine an output level signal depending on the light channel level value if no power reduction parameter has been received and to determine a scaled output level signal if the power reduction parameter has been received, the scaled output level signal being equal to the output level signal multiplied by the power reduction parameter, and to send the output level signal or the scaled output level signal to drivers of light sources of the lighting system.

It will be appreciated that, for clarity, the above description describes embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted that in this document the word 'comprising' does not exclude the presence of elements or steps other than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. A light control system for controlling a lighting system, wherein the light control system is arranged to receive a power reduction parameter (alpha), the light control system comprising:
   a light controller (134) arranged to:
      receive a measured light value from a light sensor,
      determine a light channel level value depending on the measured light value and a calibrated setpoint value if no power reduction parameter has been received, and
      determine a light channel level value depending on the measured light value and a scaled calibrated setpoint value if the power reduction parameter has been received, the scaled calibrated setpoint value being equal to the calibrated setpoint value multiplied by the power reduction parameter;
   a load controller arranged to:
      receive the light channel level value from the light controller,
      determine an output level signal depending on the light channel level value if no power reduction parameter has been received and
      determine a scaled output level signal if the power reduction parameter has been received, the scaled output level signal being equal to the output level signal multiplied by the power reduction parameter, and
      send the output level signal or the scaled output level signal to drivers of light sources of the lighting system.

2. The light control system according to claim 1, wherein the light controller is arranged to determine the light $$\text{TargetLux}(t_0) = \text{SetPointCal}$$

$$\text{TargetLux}(t_0+1) = \text{alpha} * \text{SetPointCal}$$

with
   SetPointCal being the desired light level in a controlled space,
   TargetLux($t_0$) being a targeted overall light level to be delivered to the controlled space, before applying the reduction parameter,
   TargetLux($t_0$+1) being the targeted overall light level to be delivered to the controlled space, after applying the reduction parameter,
   the light controller further being arranged to determine the light channel level by calculating:

$$\text{LightChannelLevel}(t) = (\text{TargetLux} - \text{DL}(t)) \times \text{LightChannelCal}/\text{SetPointCal}$$

with
   LightChannelLevel(t) being the light channel level determined at time t,
   TargetLux being the targeted overall light level,
   DL(t) being the daylight contribution sensed by the light sensor at time t, and
   LightChannelCal being the light channel level determined during a calibration/commissioning process when the controlled space is kept at a desired light level.

3. The light control system according to claim 1, wherein the load controller is arranged to determine the scaled output level signal by calculating:

$$\text{LightOutput}(t) = \text{alpha} * \text{LightChannelLevel}(t)$$

with
   LightOutput(t) being the scaled output level signal at time t,
   alpha being the power reduction parameter, and
   LightChannelLevel(t) being the light channel level value at t.

4. The light control system according to claim 1, wherein the load controller is arranged to determine the output level signal so that a difference between the output level signal of two consecutive steps is:

$$\text{LightOutput}(t) - \text{LightOutput}(t+1) = \text{FadeStepPower} * \text{LightChannelLevel}(t) + \text{FadeStepDL}(t) * \text{alpha}$$

with
   LightOutput(t) being output level signal at step t,
   FadeStepDL(t) being fade step of daylight regulation at step t,
   FadeStepPower being fade step of the power reduction factor,
   alpha being power reduction factor.

5. The light control system according to claim 4, wherein a value for the parameter FadeStepPower is half the size of a daylight regulation fading step size used by the light controller.

6. A lighting system comprising the light control system according to claim 1 and a light sensor module, the light sensor module comprising the light controller and a photo sensor.

7. A lighting system comprising the lighting control system according to claim 1, one or more light sources and one or more drivers for driving the light sources.

8. A method of operating a light control system for controlling a lighting system, the method comprising:
   receiving a measured light value from a light sensor;
   determining a light channel level value depending on the measured light value and a calibrated setpoint value if no power reduction parameter has been received;
   determining a light channel level value depending on the measured light value and a scaled calibrated setpoint value if the power reduction parameter has been received, the scaled calibrated setpoint value being equal to the calibrated setpoint value multiplied by the power reduction parameter;
   determining an output level signal depending on the light channel level value if no power reduction parameter has been received;
   determining a scaled output level signal if the power reduction parameter has been received, the scaled output level signal being equal to the output level signal multiplied by the power reduction parameter, and
   sending the output level signal or the scaled output level signal to drivers of light sources of the lighting system.

9. A computer program product downloadable from a network and/or stored on a computer-readable medium and/or microprocessor-executable medium, the product comprising program code instructions for implementing the method according to claim 8 when executed on a computer.

* * * * *